United States Patent
Guillonnet (10) Patent No.: US 11,216,005 B1
(45) Date of Patent: Jan. 4, 2022

(54) GENERATING A POINT CLOUD CAPTURE PLAN

(71) Applicant: Accenture Global Solutions Limited, Dublin (IE)

(72) Inventor: Adrien Guillonnet, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/948,931

(22) Filed: Oct. 6, 2020

(51) Int. Cl.
    *G06T 7/521*    (2017.01)
    *G01C 11/02*    (2006.01)
    *G05D 1/02*    (2020.01)
    *G06T 17/00*    (2006.01)
    *G06T 17/05*    (2011.01)

(52) U.S. Cl.
    CPC .......... *G05D 1/0251* (2013.01); *G01C 11/025* (2013.01); *G05D 1/0274* (2013.01); *G06T 7/521* (2017.01); *G06T 17/00* (2013.01); *G06T 17/05* (2013.01); *G06T 2207/10028* (2013.01)

(58) Field of Classification Search
    CPC .......... G06T 7/521; G06T 15/40; G06T 17/05; G06T 15/06; G06T 19/20; G06T 17/00; G01S 17/89; G01S 17/894; G01C 11/02; G01C 11/025; G08B 13/19641; G05D 1/0251; G05D 1/0274
See application file for complete search history.

(56) References Cited

U.S. PATENT DOCUMENTS 5,831,621 A * 11/1998 Pito .................. G01B 11/24
    345/419
8,705,893 B1 * 4/2014 Zhang ................. G06T 7/74
    382/285
(Continued)

FOREIGN PATENT DOCUMENTS

JP     2007212264 A * 8/2007
WO    WO-2016/038208 A2 * 3/2016
WO    WO-2019/242516 A1 * 12/2019

OTHER PUBLICATIONS

Gonzalez-Banos, Hector et al., "A Randomized Art Gallery Algorithm for Sensor Placement", SCG'01: Proceedings of the Seventeenth Annual Symposium on Computational Geometry, Jun. 3-5, 2001, Medford, Massachusetts, USA, 9 pages (Year: 2001).*

(Continued)

*Primary Examiner* — David A Testardi
(74) *Attorney, Agent, or Firm* — Harrity & Harrity, LLP (57) ABSTRACT

In some implementations, a device may receive a two-dimensional layout of an area to be captured by a scanner and scanner parameters associated with the scanner. The device may calculate a reduced field of view for the scanner based on the scanner parameters. The device may calculate, based on the two-dimensional layout and the reduced field of view, a point cloud capture plan identifying a minimum quantity of locations in the area at which to position the scanner to capture all of the area. The device may modify the point cloud capture plan, based on obstructions identified in the two-dimensional layout and based on the reduced field of view, to generate a modified point cloud capture plan, and (Continued)

may optimize the modified point cloud capture plan to generate a final point cloud capture plan. The device may perform one or more actions based on the final point cloud capture plan.

20 Claims, 9 Drawing Sheets

(56) References Cited

U.S. PATENT DOCUMENTS

| | | | | |
|---|---|---|---|---|
| 10,447,991 | B1* | 10/2019 | Zweigle | G01C 21/16 |
| 10,565,786 | B1* | 2/2020 | Klein | G06F 3/0482 |
| 2003/0137449 | A1* | 7/2003 | Vashisth | G01S 19/42 |
| | | | | 342/357.31 |
| 2006/0017720 | A1* | 1/2006 | Li | G06T 17/10 |
| | | | | 345/419 |
| 2008/0007720 | A1* | 1/2008 | Mittal | H04N 5/247 |
| | | | | 356/138 |
| 2012/0039526 | A1* | 2/2012 | Garaas | G06T 17/05 |
| | | | | 382/154 |
| 2012/0123563 | A1* | 5/2012 | Drinkard | F16P 3/142 |
| | | | | 700/13 |
| 2012/0307067 | A1* | 12/2012 | Chen | H04N 7/181 |
| | | | | 348/159 |
| 2013/0176305 | A1* | 7/2013 | Ito | G01C 15/002 |
| | | | | 345/420 |
| 2016/0016312 | A1* | 1/2016 | Lawrence, III | B23Q 17/2233 |
| | | | | 700/98 |
| 2016/0314593 | A1* | 10/2016 | Metzler | G01C 15/002 |
| 2018/0117760 | A1* | 5/2018 | Lim | B25J 9/1694 |
| 2018/0158200 | A1* | 6/2018 | Metzler | G06T 7/38 |
| 2018/0165547 | A1* | 6/2018 | Huang | G06K 9/6232 |
| 2018/0350152 | A1* | 12/2018 | Bilinski | G06T 19/20 |
| 2019/0272655 | A1* | 9/2019 | Santos | G06T 11/60 |
| 2019/0285412 | A1* | 9/2019 | Jarroush | G06K 9/00637 |
| 2020/0096641 | A1* | 3/2020 | Sasaki | G01S 17/89 |
| 2020/0379116 | A1* | 12/2020 | Ramadneh | G01S 7/4808 |
| 2021/0003405 | A1* | 1/2021 | Choi | G01C 21/32 |
| 2021/0018929 | A1* | 1/2021 | Choi | G05D 1/0274 |
| 2021/0109537 | A1* | 4/2021 | Li | G05D 1/0257 |
| 2021/0183081 | A1* | 6/2021 | Wohlfeld | G01S 7/4817 |

OTHER PUBLICATIONS

Blaer, Paul S. et al., "Two Stage View Planning for Large-Scale Site Modeling", Proceedings of the Third International Symposium on 3D Data Processing, Visualization, and Transmission (3DPVT'06), Jun. 14-16, 2006, 8 pages (Year: 2006).*

Erdem, Ugur Murat et al., "Automated camera layout to satisfy task-specific and floor plan-specific coverage requirements", Computer Vision and Image Understanding 103 (2006), pp. 156-169 (Year: 2006).*

Blaer, Paul S. et al., "Data Acquisition and View Planning for 3-D Modeling Tasks", Proceedings of the 2007 IEEE/RSJ International Conference on Intelligent Robots and Systems, San Diego, CA, USA, Oct. 29-Nov. 2, 2007, Paper No. TuB4.1, pp. 417-422. (Year: 2007).*

Blaer, Paul S., "View Planning for Automated Site Modeling", Columbia University Ph.D. Thesis, 2008, UMI No. 3333303, ProQuest document ID 304626032, Copyright 2008 by ProQuest LLC, 131 pages. (Year: 2008).*

Blaer, Paul S. et al., "View Planning and Automated Data Acquisition for Three-Dimensional Modeling of Complex Sites", Journal of Field Robotics 26(11-12), 865-891 (2009), (c) 2009 Wiley Periodicals, Inc., pp. 865-891. (Year: 2009).*

Torabi, Liila, "Integrated view and path planning for a fully autonomous mobile-manipulator system for 3D object modeling", Simon Fraser University Ph.D. Thesis, Spring 2012, 128 pages (Year: 2012).*

Soudarissanane, Sylvie Shoba, "The Geometry of Terrestrial Laser Scanning", Technische Universiteit Delft Ph.D. Thesis, 2016, ISBN 978-94-6233-203-4, 146 pages (Year: 2016).*

Wikipedia article, "Art gallery problem", Old revision dated Jul. 7, 2020, 4 pages (Year: 2020).*

Zhang, Sijian et al., "Viewpoint planning for automated 3D digitization using a low-cost mobile platform", The 2009 IEEE/RSJ International Conference on Intelligent Robots and Systems, Oct. 11-15, 2009, St. Louis, USA, pp. 4369 to 4374 (Year: 2009).*

Zhang, Sijian et al., "An efficient planning method for mobile robot based 3d digitization", Proceedings of the 8th World Congress on Intelligent Control and Automation, Jul. 6-9, 2010, Jinan, China, pp. 1348-1353. (Year: 2010).*

Alarcon-Herrera, Jose Luis et al., "Viewpoint selection for vision systems in industrial applications", 2014 IEEE International Conference on Robotics & Automation (ICRA), Hong Kong Convention and Exhibition Center, May 31-Jun. 7, 2014. Hong Kong, China, pp. 4934-4939. (Year: 2014).*

Lindskog, Erik et al., "Lessons learned from 3D laser scanning of production systems", Proceedings of The 6th International Swedish Production Symposium, 2014, 8 pages. (Year: 2014).*

RobotEye RE08 User Manual, Copyright 2015, 33 pages (Year: 2015).*

Lauri, Mikko et al., "Multi-sensor next-best-view planning as matroid-constrained submodular maximization", IEEE Pre-print from arXive-Print archive, https://arxiv.org/, published Jul. 4, 2020, 8 pages. (Year: 2020).*

* cited by examiner

GENERATING A POINT CLOUD CAPTURE PLAN

BACKGROUND

A three-dimensional (3D) scanner may capture a point cloud associated with an object and/or environment to obtain spatial information concerning the object and/or environment. The point cloud may be used by another device, such as a user device, to render a digital 3D representation of the object and/or environment.

SUMMARY

In some implementations, a method includes receiving, by a device, a two-dimensional layout of an area to be captured by a scanner; receiving, by the device, scanner parameters associated with the scanner; calculating, by the device, a reduced field of view for the scanner based on the scanner parameters; calculating, by the device and based on the two-dimensional layout and the reduced field of view, a point cloud capture plan identifying a minimum quantity of locations in the area to position the scanner to capture all of the area; modifying, by the device, the point cloud capture plan, based on obstructions identified in the two-dimensional layout and based on the reduced field of view, to generate a modified point cloud capture plan; optimizing, by the device, the modified point cloud capture plan, based on the obstructions identified in the two-dimensional layout and based on the reduced field of view, to generate a final point cloud capture plan; and performing, by the device, one or more actions based on the final point cloud capture plan.

In some implementations, a device includes one or more memories and one or more processors, communicatively coupled to the one or more memories, configured to: receive a two-dimensional layout of an area to be captured by a scanner; receive scanner parameters associated with the scanner; calculate a width of a field of view for the scanner based on a horizontal field of view parameter and an optimal distance parameter provided in the scanner parameters; calculate a height of the field of view based on a vertical field of view parameter and the optimal distance parameter provided in the scanner parameters; calculate a reduced field of view for the scanner based on the width of the field of view, the height of the field of view, and a reduction coefficient; calculate, based on the two-dimensional layout and the reduced field of view, a point cloud capture plan identifying a minimum quantity of locations in the area to position the scanner to capture all of the area; modify the point cloud capture plan, based on obstructions identified in the two-dimensional layout and based on the reduced field of view, to generate a modified point cloud capture plan; optimize the modified point cloud capture plan, based on the obstructions identified in the two-dimensional layout and based on the reduced field of view, to generate a final point cloud capture plan; and perform one or more actions based on the final point cloud capture plan.

In some implementations, a non-transitory computer-readable medium storing a set of instructions includes one or more instructions that, when executed by one or more processors of a device, cause the device to: receive a two-dimensional layout of an area to be captured by a scanner; receive scanner parameters associated with the scanner; calculate a reduced field of view for the scanner based on the scanner parameters; calculate, based on the two-dimensional layout and the reduced field of view, a point cloud capture plan identifying a minimum quantity of locations in the area to position the scanner to capture all of the area; modify the point cloud capture plan, based on obstructions identified in the two-dimensional layout and based on the reduced field of view, to generate a modified point cloud capture plan; optimize the modified point cloud capture plan, based on the obstructions identified in the two-dimensional layout and based on the reduced field of view, to generate a final point cloud capture plan; cause the scanner to capture point clouds at locations of the area identified in the final point cloud capture plan; and generate a three-dimensional digital layout based on the point clouds.

DETAILED DESCRIPTION

The following detailed description of example implementations refers to the accompanying drawings. The same reference numbers in different drawings may identify the same or similar elements.

Typically, a scanner may capture multiple point clouds associated with an environment to be able to obtain enough data (e.g., enough points) that can be used to accurately render a digital 3D layout of the environment. Ensuring a high quality capture of point clouds associated with the environment can be a difficult and time-intensive process. Moreover, individual point clouds are often associated with one or more of the same portions of the environment (e.g., individual point clouds often overlap), which creates duplicate data (e.g., duplicate points). In many cases, when a device (e.g., the scanner and/or another computing device) processes the data associated with the multiple point clouds (e.g., to generate a digital 3D layout), the device also processes multiple sets of duplicate data, which causes the device to unnecessarily consume computing resources (e.g., processing resources, memory resources, power resources, and/or the like) of the device. Furthermore, when the environment includes obstacles that obstruct zones of the environment from particular capture angles, additional point clouds are often captured in order to cover the zones of the environment from different angles, which increases a likelihood of obtaining even more duplicate data and further unnecessary use of computing resources.

Some implementations described herein provide a capture optimization system that obtains a layout (e.g., a 2D layout) of an area and scanner parameters (e.g., a field of view of the scanner, an optimal optical distance of the scanner, and/or a resolution of the scanner, among other examples). The capture optimization system may calculate a reduced field of view for the scanner (e.g., a portion of the field of view of the scanner associated with high quality, accurate capture of point clouds) based on the scanner parameters. The capture optimization system may calculate, based on the 2D layout and the reduced field of view, a point cloud capture plan that identifies a minimum quantity of locations in the area to position the scanner in order to capture all of the area. The device may modify the point cloud capture plan, based on obstructions identified in the two-dimensional layout and based on the reduced field of view, to generate a modified point cloud capture plan, and may optimize the modified point cloud capture plan to generate a final point cloud capture plan. The device may then perform one or more actions based on the final point cloud capture plan, such as providing instructions to an autonomous vehicle or a technician to cause the scanner to capture point clouds according to the final point cloud capture plan.

In this way, the capture optimization system facilitates an efficient (e.g., in terms of a number of point clouds to be captured, an amount of time to capture the number of point clouds, and/or an amount of time to position and/or align the scanner, among other examples) capture of point clouds associated with the area. The final point cloud capture plan generated by the capture optimization system may be used by the scanner to obtain an optimal amount of point clouds to cover the area, including zones of the area that are obstructed by obstructions, with a minimal amount of overlap between point clouds. Accordingly, when the scanner obtains point clouds according to the final point cloud capture plan, a total amount of data (e.g., a total amount of points) captured by the scanner is less than (and includes less duplicate data than) an amount of data that would otherwise be captured by the scanner. This reduces use of computing resources (e.g., processing resources, memory resources, power resources, and/or the like) of a device (e.g., the scanner and/or a computing device) to process the data captured by the scanner (e.g., to render a 3D layout of the area) and reduces and/or eliminates unnecessary use of the computing resources to process duplicate data.

Figure 1A:
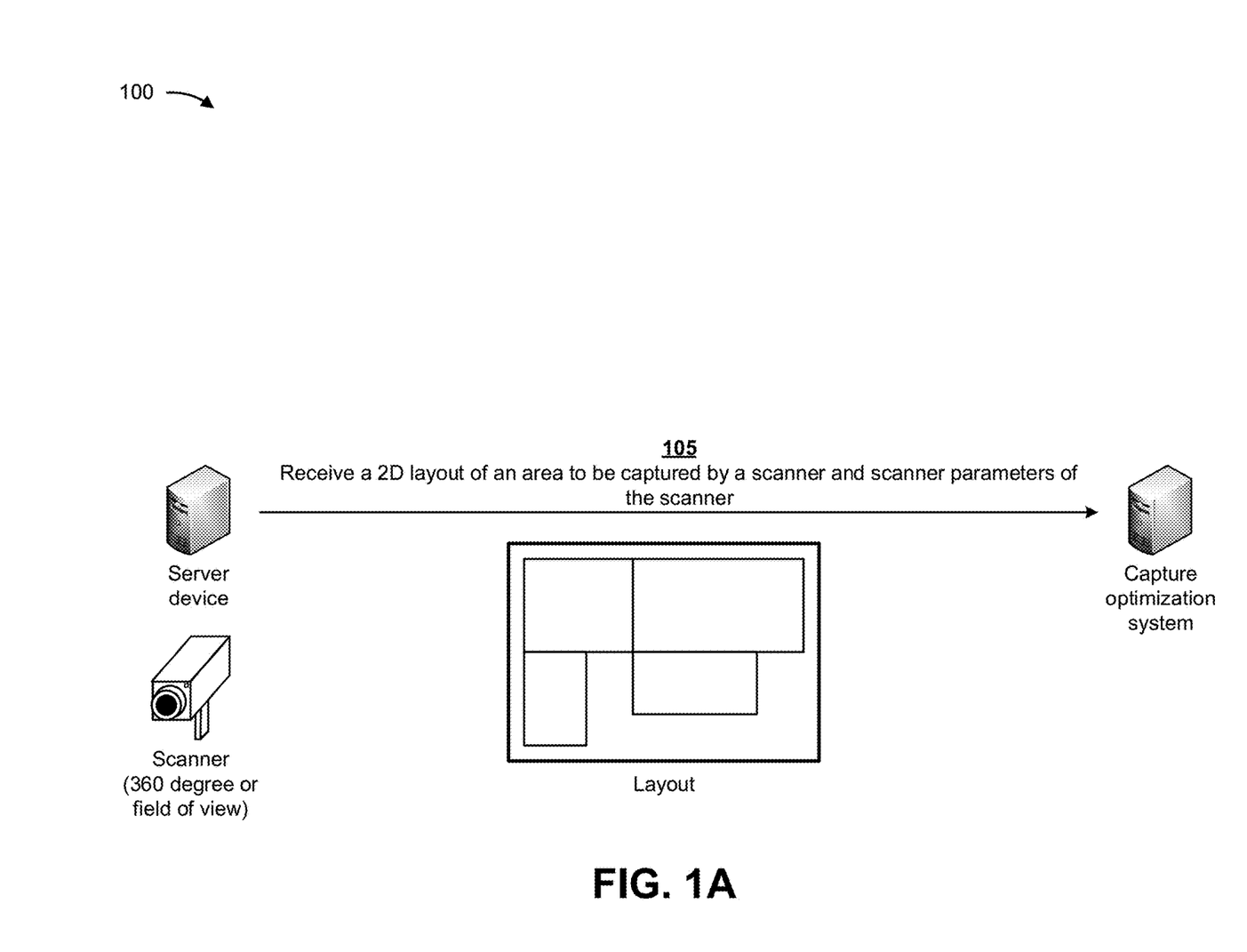
FIGS. 1A-1F are diagrams of an example implementation described herein.

FIGS. 1A-1F are diagrams of an example 100 associated with generating a high quality point cloud capture plan. As shown in FIG. 1A, example 100 includes a scanner, a server device, and a capture optimization system. In some implementations, the scanner, the server device, and/or the capture optimization system may be connected via a network, such as a wired network (e.g., the Internet or another data network), a wireless network (e.g., a wireless local area network, a wireless wide area network, a cellular network, and/or the like), and/or the like.

The capture optimization system may include a computing device, a server device, a cloud computing device, and/or the like. The scanner may include a 3D scanner (e.g., that comprises a camera, a LIDAR sensor, a radar sensor, and/or a sonar sensor, among other examples) that is capable of capturing a point cloud concerning an environment (e.g., determining and/or generating distance and/or position measurements of points associated with the environment). The server device may include a communication and/or computing device, such as a server, a web server, a server in a cloud computing environment, and/or the like.

As shown in FIG. 1A and by reference number 105, the capture optimization system may receive a layout of an area to be captured by the scanner (e.g., an area of which the scanner is to capture one or more point clouds). The area may include some or all of an environment, such as one or more rooms of a building. The layout may be a two-dimensional (2D) layout of the area that indicates 2D spatial information related to area, such as one or more dimensions (e.g., location coordinates, lengths, widths, and/or distances, among other examples) associated with objects that define and/or are included in the area. For example, the 2D layout may be an overhead (e.g., birds-eye-view) map of the area that indicates one or more features of the area, such as walls, doors, windows, and/or walking paths. In some implementations, the server device may maintain and/or store the layout in a data structure (e.g., a database, an electronic file system, and/or one or more electronic files, among other examples) and may provide the layout to the capture optimization system (e.g., via the network that connects the server device and the capture optimization system).

In some implementations, the capture optimization system may receive scanner parameters associated with the scanner. The scanner parameters may include a field of view of the scanner, a range of the scanner, and/or a resolution of the scanner, among other examples. The field of view of the scanner may comprise a horizontal field of view parameter of the scanner (e.g., that indicates a horizontal angle of perception of the scanner) and/or a vertical field of view parameter of the scanner (e.g., that indicates a vertical angle of perception of the scanner). For example the horizontal field of view parameter may indicate that the scanner is able to capture a point cloud associated with a horizontal angle of 75 degrees, 120 degrees, and/or 360 degrees, among other examples. The range of the scanner may include a minimum capture distance parameter (e.g., a minimum capture distance of the scanner), a maximum capture distance parameter (e.g., a maximum capture distance of the scanner), and/or an optimal optical distance parameter (e.g., one or more optimal optical distances for capturing a point cloud associated with an area), among other examples. The resolution of the scanner may indicate a distance (e.g., in microns, millimeters, centimeters, and/or the like) between points that comprise a point cloud captured by the scanner. In some implementations, the scanner may provide the scanner parameters to the capture optimization system (e.g., via the network that connects the scanner and the capture optimization system). Alternatively, a user of the capture optimization system may interact with a user interface of the capture optimization system to input the scanner parameters into the capture optimization system.

Figure 1B:
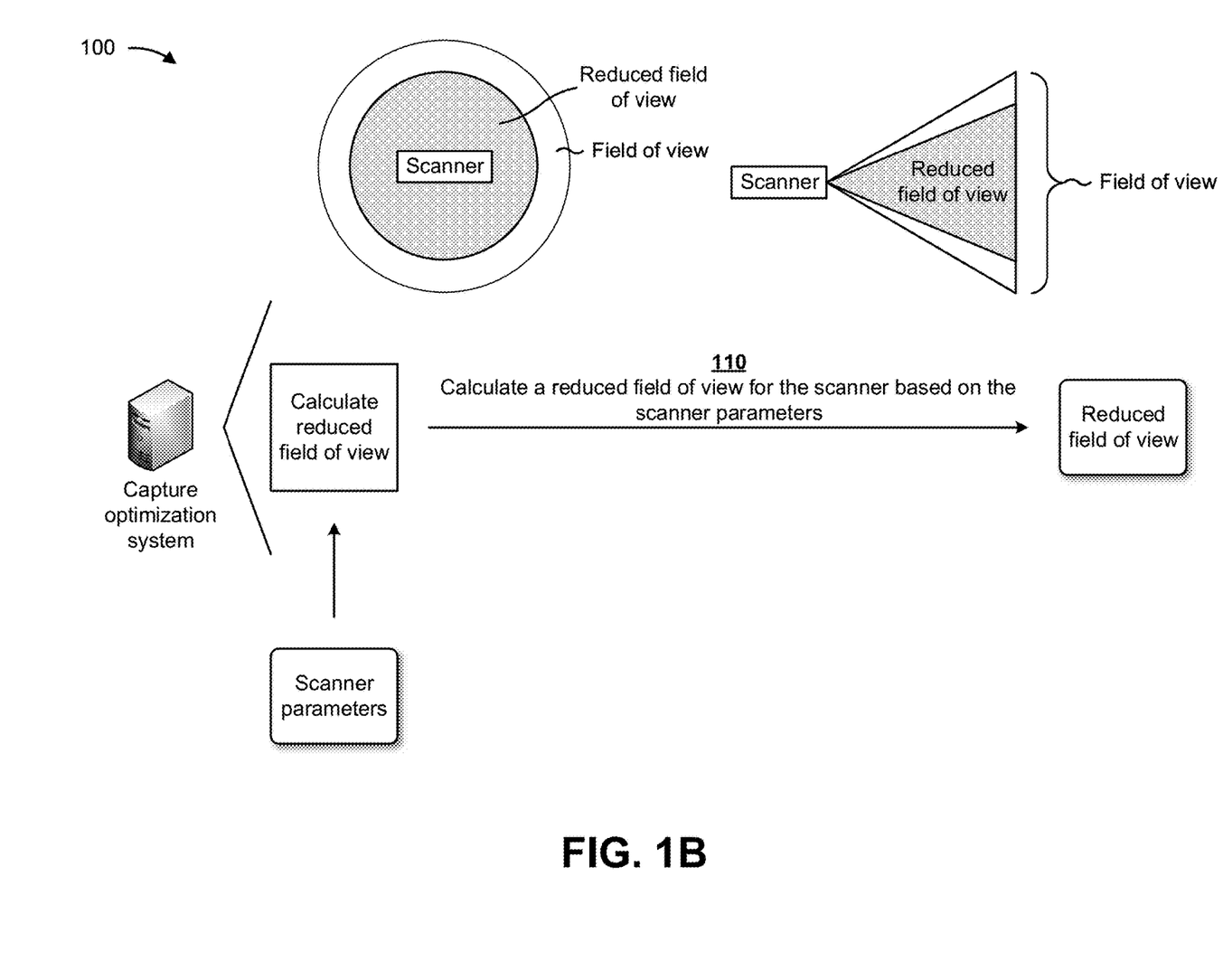

Turning to FIG. 1B and reference number 110, the capture optimization system may calculate a reduced field of view for the scanner based on the scanner parameters. In some implementations, the capture optimization system may calculate a representative width of the field of view for the scanner based on the horizontal field of view parameter and the optimal optical distance parameter and/or may calculate a representative height of the field of view based on the vertical field of view parameter and the optimal optical distance parameter. For example, the capture optimization system may use formulas of the following form to calculate the representative width of the field of view and the representative height of the field of view:

$$\text{Width} = \tan\left(\frac{HFoV}{2}\right) \times 2 \times R,$$

and $$\text{Height} = \tan\left(\frac{VFoV}{2}\right) \times 2 \times R,$$

where HFoV is the horizontal field of view parameter, VFoV is the vertical field of view parameter, and R is the optimal optical distance parameter. The capture optimization system may thereby calculate the reduced field of view based on the representative width of the field of view, the representative height of the field of view, and a reduction coefficient (e.g., where the reduction coefficient is greater than 0 and less than 1). For example, the capture optimization system may use the formulas of the following form to calculate a representative width of the reduced field of view and a representative height of the reduced field of view: Reduced_Width=Width× C, and Reduced_Height=Height×C, where C is the reduction coefficient.

In some implementations, the capture optimization system may apply the reduction coefficient to the horizontal field of view parameter and/or the vertical field of view parameter to calculate the reduced field of view of the scanner. For example the capture optimization system may use the formulas of the following form to calculate a reduced horizontal field of view parameter and/or a reduced vertical field of view parameter associated with the reduced field of view: Reduced_HFoV=HFoV×C, and Reduced_VFoV=VFoV×C.

In this way, the capture optimization system may calculate a reduced field of view to facilitate high quality point cloud capture of the area. For example, the reduced field of view may minimize overlap between point clouds captured by the scanner (e.g., when the scanner captures point clouds according to a point cloud capture plan, described herein, that is calculated by the capture optimization system based on the reduced field of view). Moreover, the reduced field of view may be associated with points, of a point cloud, that have greater measurement accuracy, thereby further facilitating the high quality point cloud capture of the area.

Figure 1C:
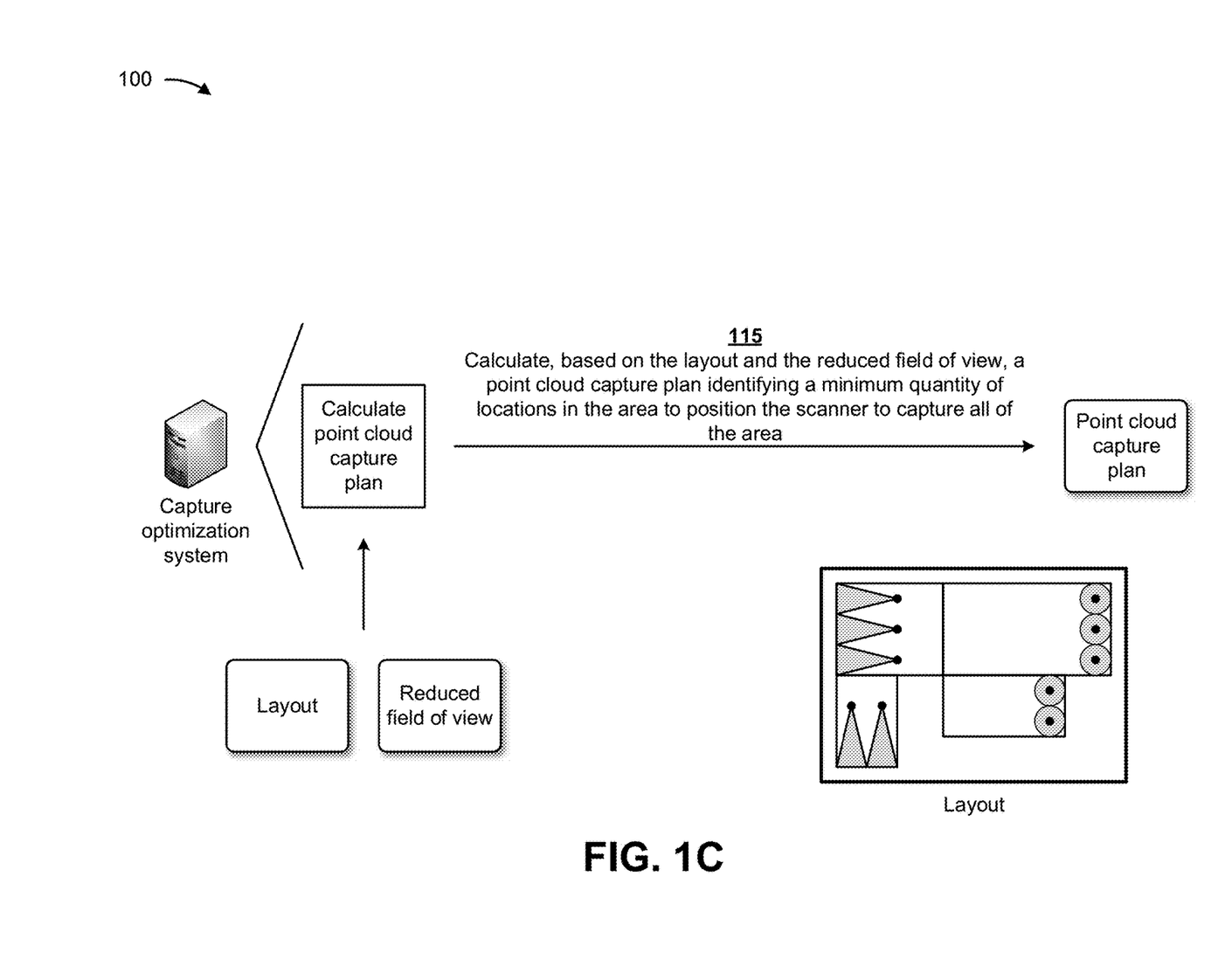

Turning to FIG. 1C and reference number 115, the capture optimization system may calculate a point cloud capture plan (e.g., for the scanner to capture one or more point clouds related to the area). In some implementations, the point cloud capture plan identifies a minimum quantity of locations in the area in which to position the scanner to allow the scanner to capture all of the area (e.g., in one or more point clouds, including, for example, a first point cloud and a second point cloud).

In some implementations, the capture optimization system may calculate the point cloud capture plan based on the layout and the reduced field of view of the scanner. For example, the capture optimization system may overlay a geometrical object (e.g., shown as a triangle or a circle in FIG. 1C) that represents the reduced field of view of the scanner on the layout multiple times until the layout is filled with multiple geometrical objects (e.g., without any "gaps" between the geometrical objects and with a minimal amount of overlap between geometrical objects). The capture optimization system may calculate the point cloud capture plan based on respective locations of the multiple geometrical objects on the layout. For example, the capture optimization system may determine that a respective point of the multiple geometric objects, such as a vertex point of a triangle and/or a center point of a circle, indicates a placement location for the scanner.

Figure 1D:
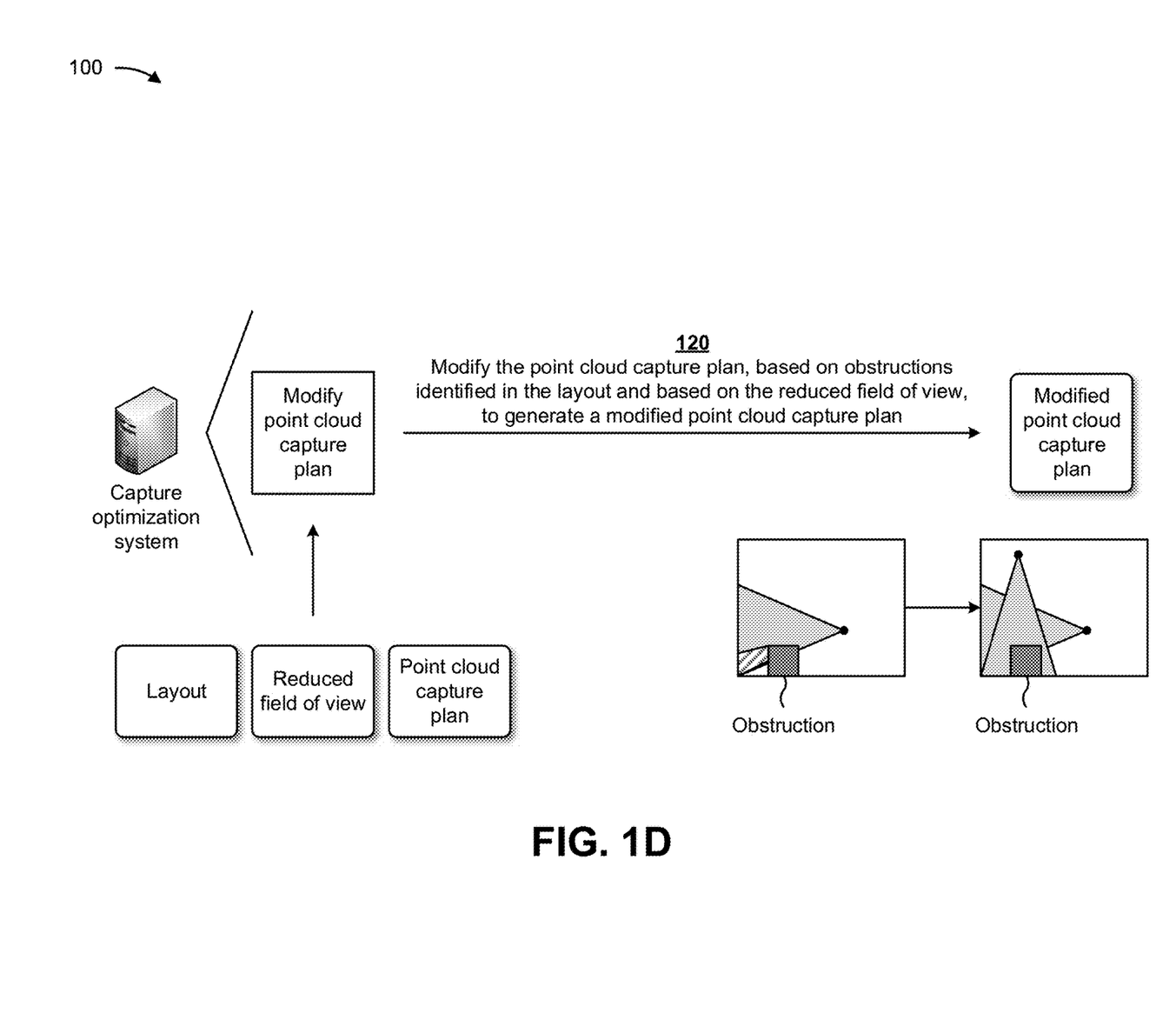

Turning to FIG. 1D and reference number 120, the capture optimization system may modify the point cloud capture plan (e.g., that was calculated by the capture optimization system as described herein in relation to FIG. 1C and reference number 115) to generate a modified point cloud capture plan. In some implementations, the capture optimization system may modify the point cloud capture plan based on one or more obstructions identified in the layout and the reduced field of view of the scanner. For example, the capture optimization system may identify one or more zones in the layout (e.g., wherein a zone is shown as a diagonally patterned portion in the left example layout of FIG. 1D) that are obstructed by the one or more obstructions (e.g., wherein an obstruction is shown as a shaded square in the left and right example layouts of FIG. 1D). The capture optimization system may determine, for a zone associated with an obstruction, one or more additional points for overlaying the geometrical object (e.g., the triangle or the circle described above in relation to FIG. 1C and reference number 115, for example) that cover the zone and avoid the obstruction. The capture optimization system may modify the point cloud capture plan to include the one or more additional points and to generate the modified point cloud capture plan. The one or more additional points may respectively indicate additional placement locations for the scanner and thereby enable the scanner to capture one or more additional point clouds (e.g., a third point cloud) of the zone (e.g., without obstruction by the one or more obstructions).

Figure 1E:
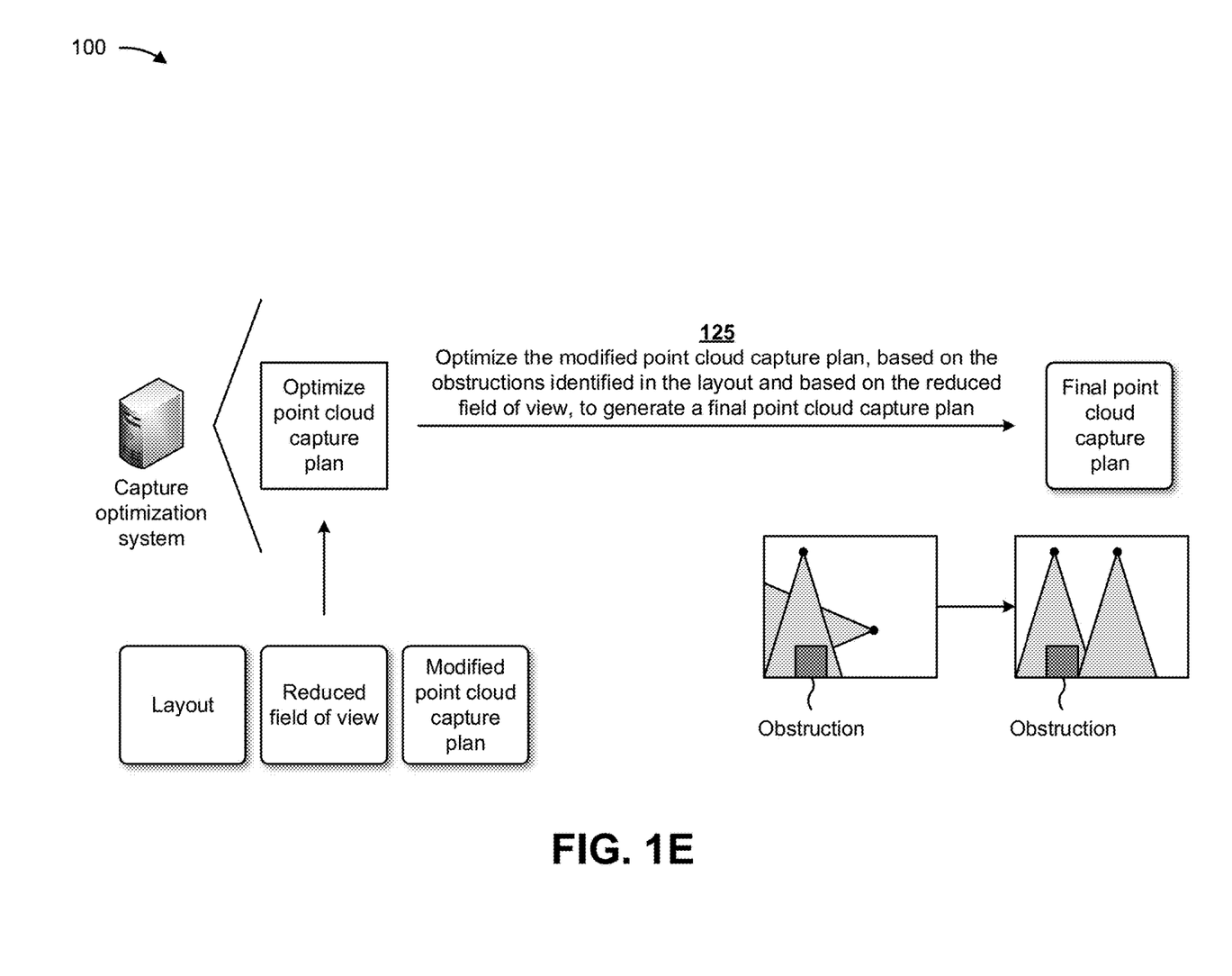

Turning to FIG. 1E and reference number 125, the capture optimization system may optimize the modified point cloud capture plan to generate a final point cloud capture plan. In some implementations, the capture optimization system may optimize the modified point cloud capture plan based on the one or more obstructions identified in the layout and the reduced field of view of the scanner. For example, the capture optimization system may identify points in the modified point cloud capture plan that cause associated geometrical objects (e.g., the triangles or the circles described above in relation to FIG. 1C and reference number 115, for example) to overlap one another. The capture optimization system may modify or eliminate one or more points, of the identified points, in the modified point cloud capture plan to generate the final modified point cloud capture plan (e.g., to reduce and/or eliminate overlapping of the geometrical objects on the layout). In this way, the capture optimization system may identify points in the modified point cloud capture plan that cause capture of overlapping point clouds of the area and may modify or eliminate one or more of the points that cause capture of the overlapping point clouds.

Figure 1F:
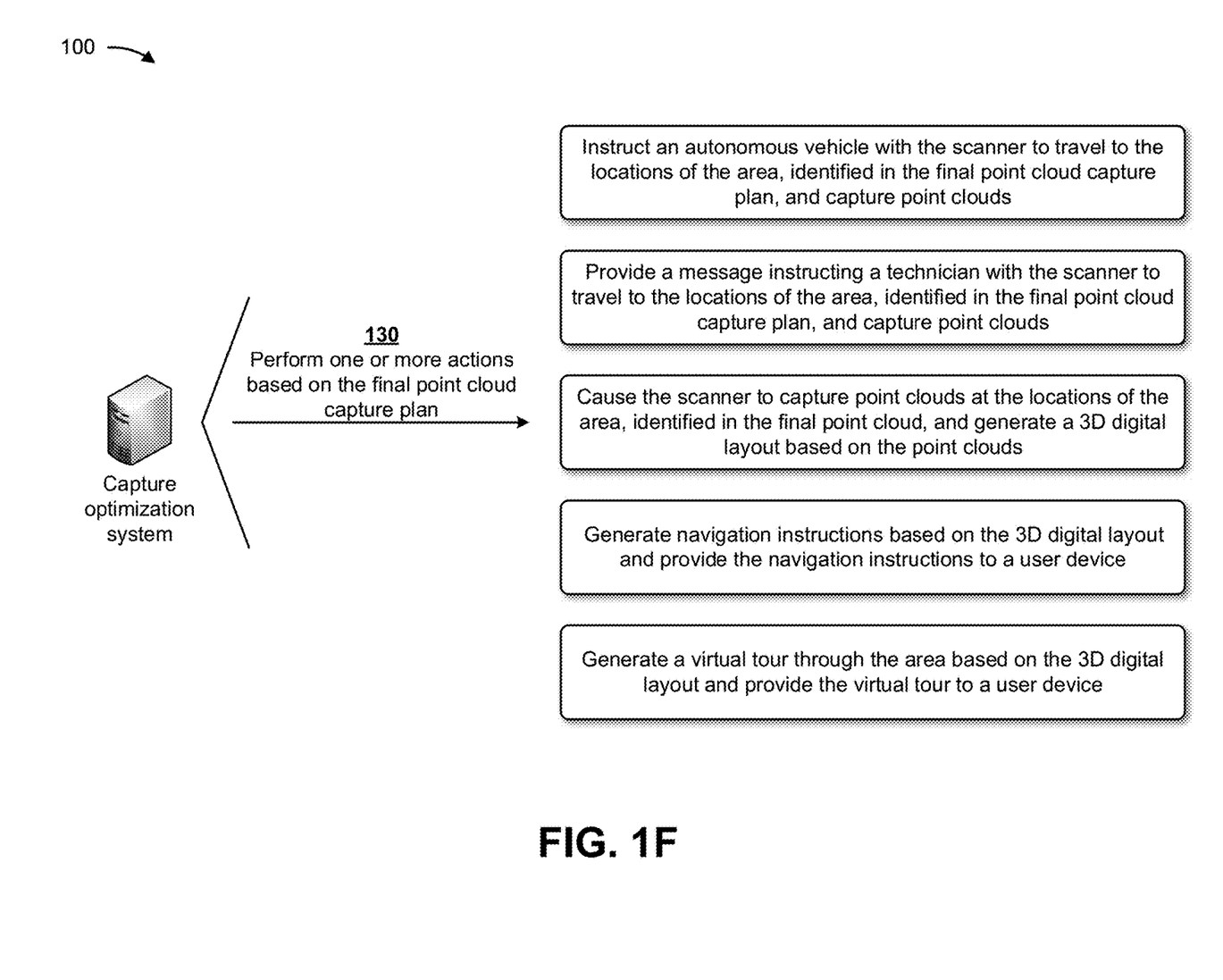

Turning to FIG. 1F and reference number 130, the capture optimization system may perform one or more actions based on the final point cloud capture plan.

In some implementations, the one or more actions may include instructing an autonomous vehicle (e.g., a robot, a drone, and/or the like) with the scanner to travel to locations of the area, identified in the final point cloud capture plan, and capture point clouds concerning the area. For example, the capture optimization system may generate one or more instructions and send the one or more instructions to the autonomous vehicle (e.g., via the network) to cause the autonomous vehicle to use the scanner to capture the point clouds according to the final point cloud capture plan. Additionally, or alternatively, the one or more actions may include providing a message (e.g., to a user device) instructing a technician with the scanner to travel to the locations of the area, identified in the final point cloud capture plan, and capture point clouds concerning the area.

In this way, the capture optimization system facilitates obtaining as few point clouds as possible to cover the area, which minimizes an amount of data that needs to be processed and an amount of computing resources (e.g., processing resources, memory resources, and/or power resources, among other examples) that needs to be utilized to process the data (e.g., to render the area as a 3D digital layout). Moreover, the capture optimization system provides an optimal path for the autonomous vehicle or technician to take, which minimizes an amount of travel time needed to capture the point clouds concerning the area and allows for more efficient capture of the point clouds. This may also reduce an amount of wear-and-tear or amount of utilization of other resources (e.g., power resources) of the autonomous vehicle, which facilitates a high quality performance of the autonomous vehicle.

In some implementations, the one or more actions include causing the scanner to capture point clouds at the locations of the area, identified in the final point cloud capture plan, to generate a 3D digital layout based on the point clouds. In this way, the capture optimization system reduces an amount of cloud points to cover the area, which reduces an amount of data that needs to be processed and an amount of computing resources (e.g., processing resources, memory resources, and/or power resources, among other examples) that needs to be utilized to process the data (e.g., to render the area as the 3D digital layout).

In some implementations, the one or more actions include generating navigation instructions based on the 3D digital layout and providing the navigation instructions to a user device. Additionally, or alternatively, the one or more actions may include generating a virtual tour through the area based on the 3D digital layout and providing the virtual tour to a user device. In this way, the capture optimization system may facilitate a physical or virtual exploration of the area by a user and may conserve computing resources of the user device that would otherwise be consumed to facilitate the user exploring the area or the 3D digital layout.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
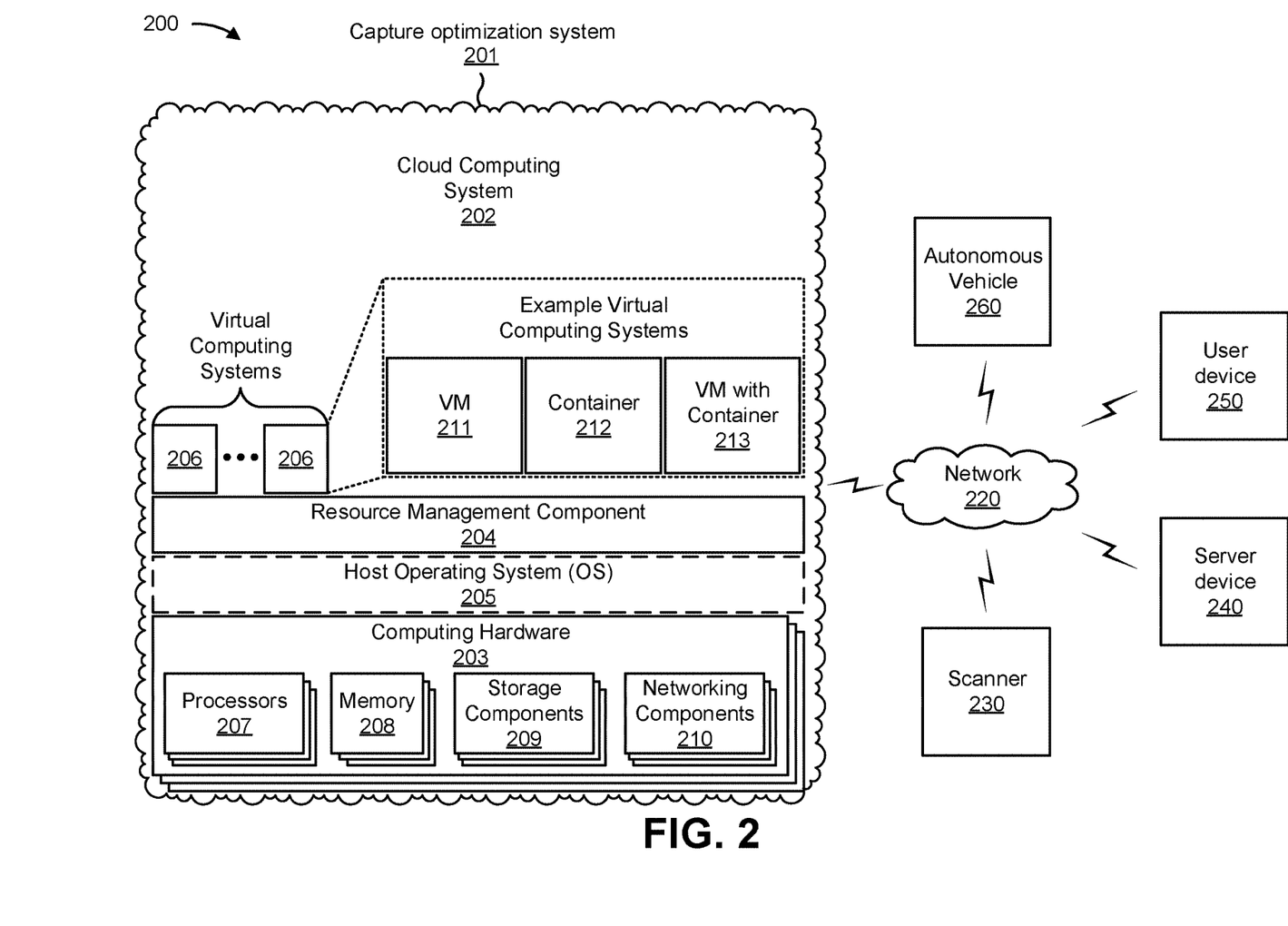
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a capture optimization system 201, which may include one or more elements of and/or may execute within a cloud computing system 202. The cloud computing system 202 may include one or more elements 203-213, as described in more detail below. As further shown in FIG. 2, environment 200 may include a network 220, a scanner 230, a server device 240, a user device 250, and/or an autonomous vehicle 260. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the capture optimization system 201 may include one or more elements 203-213 of the cloud computing system 202, may execute within the cloud computing system 202, and/or may be hosted within the cloud computing system 202, in some implementations, the capture optimization system 201 may not be cloud-based (e.g., may be implemented outside of a cloud computing system) or may be partially cloud-based. For example, the capture optimization system 201 may include one or more devices that are not part of the cloud computing system 202, such as device 300 of FIG. 3, which may include a standalone server or another type of computing device. The capture optimization system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Scanner 230 includes one or more devices capable of capturing one or more point clouds associated with an environment, as described elsewhere herein. The scanner 230 may include a stationary scanner or a mobile scanner.

The scanner 230 may have a field of view defined by one or more parameters, such as a horizontal field of view parameter (e.g., that indicates a horizontal angle of perception of the scanner 230) and/or a vertical field of view parameter of the scanner 230 (e.g., that indicates a vertical angle of perception of the scanner 230). For example, the horizontal field of view parameter may indicate that the scanner 230 is able to capture a point cloud associated with a horizontal angle of 75 degrees, 120 degrees, and/or 360 degrees, among other examples. A range of the scanner 230 may include a minimum capture distance parameter (e.g., a minimum capture distance of the scanner 230), a maximum capture distance parameter (e.g., a maximum capture distance of the scanner 230), and/or an optimal optical distance parameter (e.g., one or more optimal optical distances for capturing a point cloud associated with an area), among other examples. A resolution of the scanner 230 may indicate a distance (e.g., in microns, millimeters, centimeters, and/or the like) between points that comprise a point cloud captured by the scanner 230.

The server device 240 includes one or more devices capable of receiving, generating, storing, processing, providing, and/or routing information, as described elsewhere herein. The server device 240 may include a communication device and/or a computing device. For example, the server device 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 240 may communicate with one or more other devices of environment 200, as described elsewhere herein. In some implementations, the server device 240 may provide a layout (e.g., a 2D layout) of an area to the capture optimization system 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
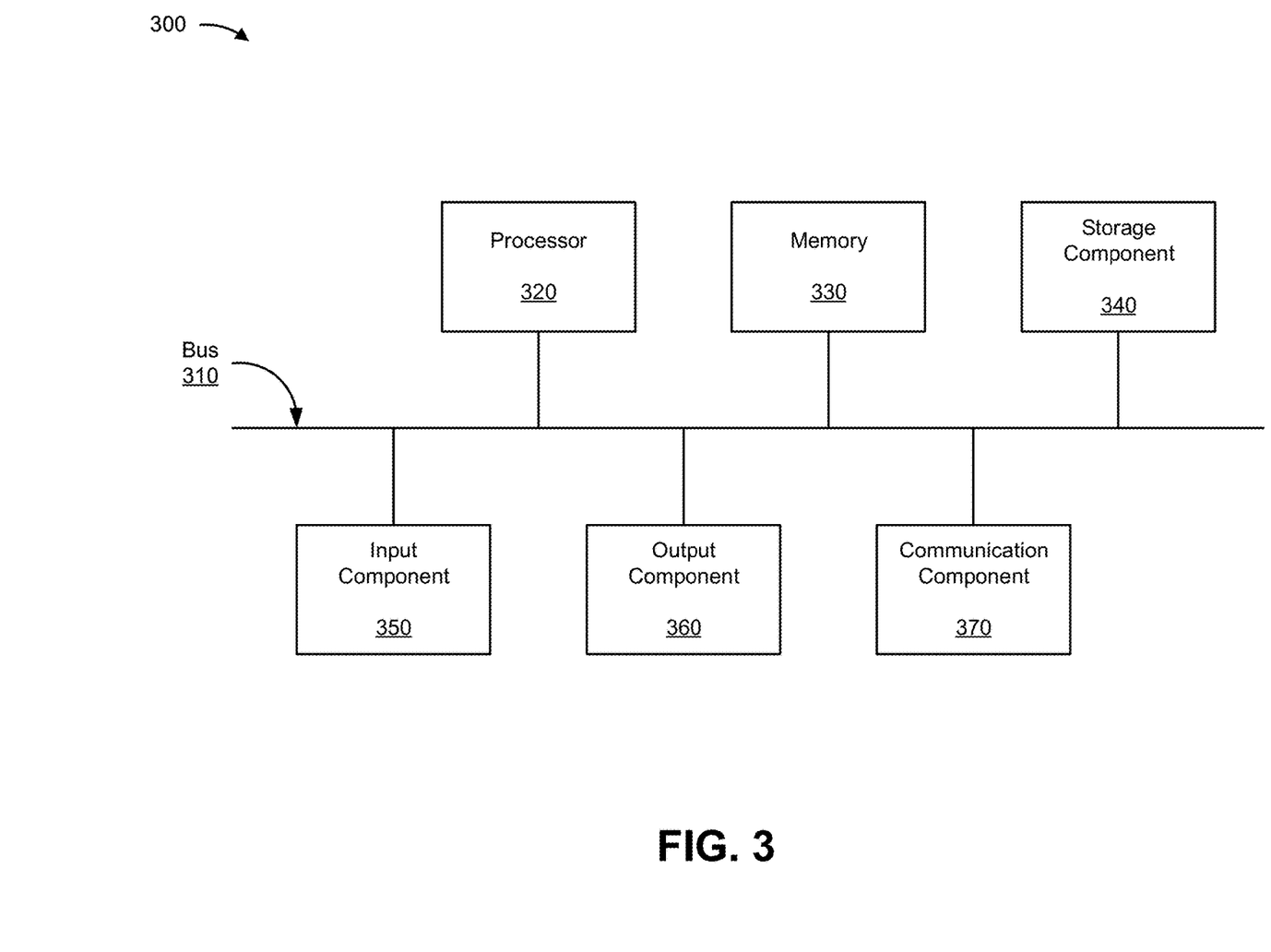
FIG. 3 is a diagram of example components of one or more devices of FIG. 2.

FIG. 3 is a diagram of example components of a device 300, which may correspond to capture optimization system 201, computing hardware 203, scanner 230, and/or server device 240. In some implementations, capture optimization system 201, computing hardware 203, scanner 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
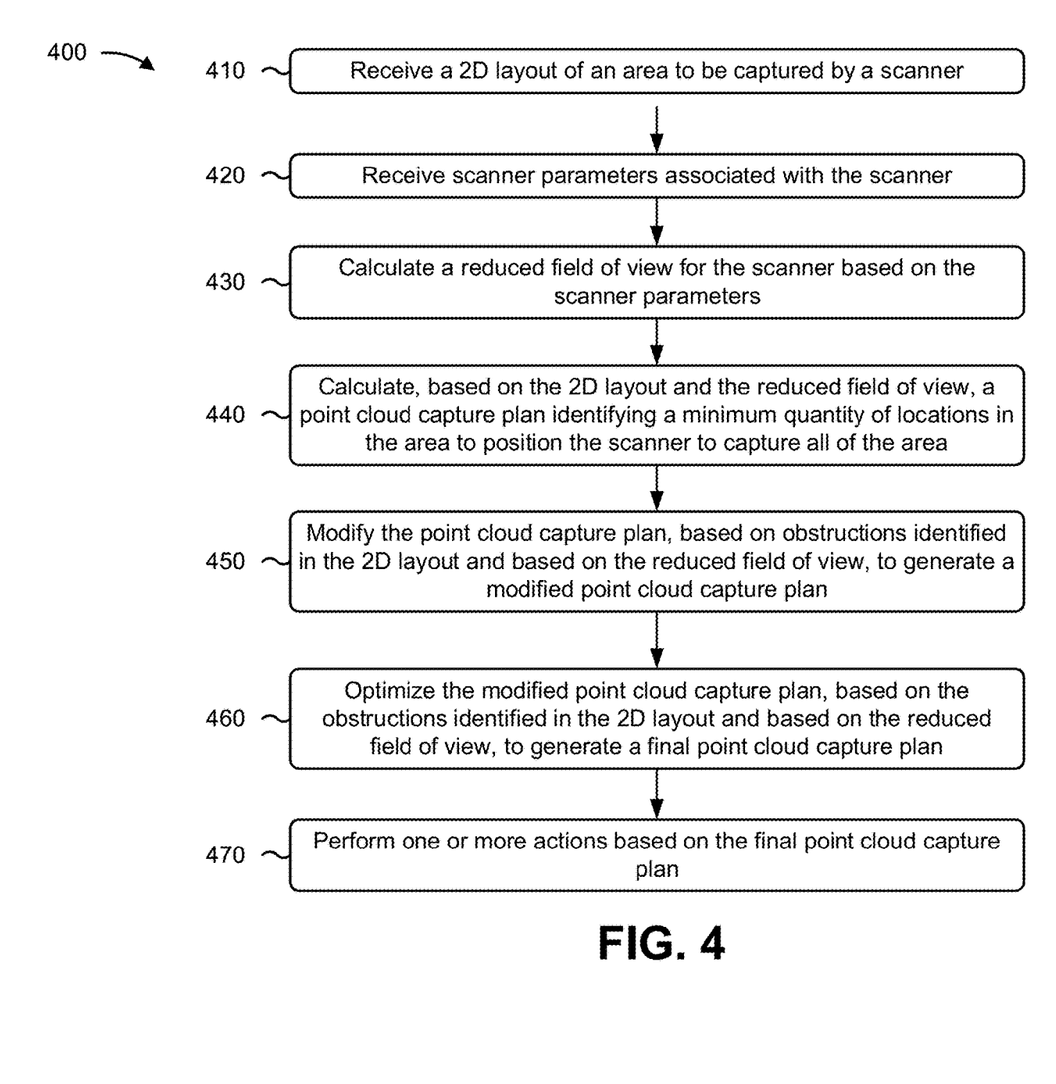
FIG. 4 is a flowchart of an example process relating to generating a point cloud capture plan.

FIG. 4 is a flowchart of an example process 400 associated with generating a point cloud capture plan. In some implementations, one or more process blocks of FIG. 4 may be performed by a device (e.g., capture optimization system 201). In some implementations, one or more process blocks of FIG. 4 may be performed by another device or a group of devices separate from or including the device, such as a scanner (e.g., scanner 230) and/or a server device (e.g., server device 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a two-dimensional layout of an area to be captured by a scanner (block 410). For example, the device may receive a two-dimensional layout of an area to be captured by a scanner, as described above.

As further shown in FIG. 4, process 400 may include receiving scanner parameters associated with the scanner (block 420). For example, the device may receive scanner parameters associated with the scanner, as described above.

As further shown in FIG. 4, process 400 may include calculating a reduced field of view for the scanner based on the scanner parameters (block 430). For example, the device may calculate a reduced field of view for the scanner based on the scanner parameters, as described above.

As further shown in FIG. 4, process 400 may include calculating, based on the two-dimensional layout and the reduced field of view, a point cloud capture plan identifying a minimum quantity of locations in the area to position the scanner to capture all of the area (block 440). For example, the device may calculate, based on the two-dimensional layout and the reduced field of view, a point cloud capture plan identifying a minimum quantity of locations in the area to position the scanner to capture all of the area, as described above.

As further shown in FIG. 4, process 400 may include modifying the point cloud capture plan, based on obstructions identified in the two-dimensional layout and based on the reduced field of view, to generate a modified point cloud capture plan (block 450). For example, the device may modify the point cloud capture plan, based on obstructions identified in the two-dimensional layout and based on the reduced field of view, to generate a modified point cloud capture plan, as described above.

As further shown in FIG. 4, process 400 may include optimizing the modified point cloud capture plan, based on the obstructions identified in the two-dimensional layout and based on the reduced field of view, to generate a final point cloud capture plan (block 460). For example, the device may optimize the modified point cloud capture plan, based on the obstructions identified in the two-dimensional layout and based on the reduced field of view, to generate a final point cloud capture plan, as described above.

As further shown in FIG. 4, process 400 may include performing one or more actions based on the final point cloud capture plan (block 470). For example, the device may perform one or more actions based on the final point cloud capture plan, as described above.

Process 400 may include additional implementations, such as any single implementation or any combination of implementations described below and/or in connection with one or more other processes described elsewhere herein.

In a first implementation, calculating the reduced field of view for the scanner comprises calculating a width of a field of view for the scanner based on a horizontal field of view parameter and an optimal distance parameter, calculating a height of the field of view based on a vertical field of view parameter and the optimal distance parameter, and calculating the reduced field of view based on the width of the field of view, the height of the field of view, and a reduction coefficient.

In a second implementation, alone or in combination with the first implementation, the reduced field of view minimizes overlap between point clouds captured by the scanner in the area based on the final point cloud capture plan.

In a third implementation, alone or in combination with one or more of the first and second implementations, calculating the point cloud capture plan comprises overlaying a geometrical object, representing the reduced field of view, on the two-dimensional layout of the area multiple times until the two-dimensional layout of the area is filled with multiple geometrical objects, and calculating the point cloud capture plan based on locations of the multiple geometrical objects on the two-dimensional layout of the area.

In a fourth implementation, alone or in combination with one or more of the first through third implementations, the geometrical object includes at least one of a triangle, or a circle.

In a fifth implementation, alone or in combination with one or more of the first through fourth implementations, modifying the point cloud capture plan, based on the obstructions identified in the two-dimensional layout and based on the reduced field of view, to generate the modified point cloud capture plan comprises identifying zones in the two-dimensional layout that are obstructed by the obstructions, determining additional points, for the point cloud capture plan, that enable capturing point clouds of the zones that are obstructed by the obstructions, and modifying the point cloud capture plan to include the additional points and to generate the modified point cloud capture plan.

In a sixth implementation, alone or in combination with one or more of the first through fifth implementations, optimizing the modified point cloud capture plan, based on the obstructions identified in the two-dimensional layout and based on the reduced field of view, to generate the final point cloud capture plan comprises identifying points in the modified point cloud capture plan that cause capture of overlapping point clouds of the area, and modifying or eliminating one or more of the points in the modified point cloud capture plan, that cause capture of the overlapping point clouds, to generate the final point cloud capture plan.

In a seventh implementation, alone or in combination with one or more of the first through sixth implementations, performing the one or more actions comprises instructing an autonomous vehicle with the scanner to travel to locations of the area, identified in the final point cloud capture plan, and capture point clouds; providing a message instructing a technician with the scanner to travel to the locations of the area, identified in the final point cloud capture plan, and capture point clouds; or causing the scanner to capture point clouds at the locations of the area, identified in the final point cloud capture plan, to generate a three-dimensional digital layout based on the point clouds.

In an eighth implementation, alone or in combination with one or more of the first through seventh implementations, performing the one or more actions comprises causing the scanner to capture point clouds at locations of the area identified in the final point cloud capture plan, generating a three-dimensional digital layout based on the point clouds, generating navigation instructions based on the three-dimensional digital layout, and providing the navigation instructions to a user device.

In a ninth implementation, alone or in combination with one or more of the first through eighth implementations, performing the one or more actions includes causing the scanner to capture point clouds at locations of the area identified in the final point cloud capture plan, and generating a three-dimensional digital layout based on the point clouds. In some implementations, performing the one or more actions further comprises generating a virtual tour through the area based on the three-dimensional digital layout, and providing the virtual tour to a user device.

In a tenth implementation, alone or in combination with one or more of the first through ninth implementations, the scanner includes one of a stationary scanner, or a three-hundred and sixty degree scanner.

In an eleventh implementation, alone or in combination with one or more of the first through tenth implementations, performing the one or more actions includes instructing an autonomous vehicle with the scanner to travel to locations of the area, identified in the final point cloud capture plan, and capture point clouds, receiving the point clouds from the scanner, and generating a three-dimensional digital layout based on the point clouds.

In a twelfth implementation, alone or in combination with one or more of the first through eleventh implementations, the scanner parameters include one or more of a field of view of the scanner, a range of the scanner, or a resolution of the scanner.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a two-dimensional layout of an area to be captured by a scanner, wherein the two-dimensional layout of the area comprises a plurality of zones;
   receiving, by the device, scanner parameters associated with the scanner;
   calculating, by the device, a reduced field of view for the scanner based on the scanner parameters,
      wherein the reduced field of view is a portion of a field of view of the scanner;
   overlaying, by the device and using the reduced field of view, a geometrical object, representing the reduced field of view, on the area until the area is filled with a plurality of geometrical objects;
   calculating, by the device and based on locations of the plurality of geometrical objects in the area, a point cloud capture plan for the scanner to capture a first point cloud and a second point cloud,
      wherein the point cloud capture plan identifies a first location and a second location, associated with a first point and a second point of a first geometrical object and a second geometrical object of the plurality of geometrical objects, respectively, in the area to position the scanner to capture the area in the first point cloud and the second point cloud, respectively;
   identifying, by the device and based on calculating the point cloud capture plan, a zone, of the plurality of zones of the two-dimensional layout, that is at least partially obstructed by an obstruction;
   determining, by the device and based on identifying the zone, a third point, of a third geometrical object that is different from the plurality of geometrical objects and to be overlaid on the area, for capturing a third point cloud and generating a modified point cloud capture plan,
      wherein the modified point cloud capture plan identifies the first location, the second location, and a third location, and
      wherein the third location is associated with the third point;
   modifying or eliminating, by the device and based on generating the modified point cloud capture plan, at least one of the first point or the second point to reduce a size of an overlapping portion between the third point cloud and at least one of the first point cloud and or the second point cloud to generate a final point cloud capture plan; and
   performing, by the device and based on generating the final point cloud capture plan, one or more actions,
      wherein the one or more actions include:
         causing the scanner to capture point clouds of the final point cloud capture plan to generate a three-dimensional digital layout based on the point clouds of the final point cloud capture plan.

2. The method of claim 1, wherein the scanner parameters include a horizontal field of view parameter, a vertical field of view parameter, and a distance parameter for the scanner to capture the area of the two-dimensional layout, and
   wherein calculating the reduced field of view for the scanner comprises:
      calculating a width of a field of view for the scanner based on the horizontal field of view parameter and the distance parameter;

calculating a height of the field of view based on the vertical field of view parameter and the distance parameter; and calculating the reduced field of view based on the width of the field of view, the height of the field of view, and a reduction coefficient.

3. The method of claim 1, wherein overlaying the plurality of geometrical objects using the reduced field of view provides a reduced overlapping portion between the first point cloud and the second point cloud.

4. The method of claim 1, wherein at least one geometrical object, of the plurality of geometrical objects, includes at least one of:

a triangle, or a circle.

5. The method of claim 1, further comprising:

identifying the at least one of the first point or the second point of the modified point cloud capture plan as causing the overlapping portion for modifying or eliminating the at least one of the first point or the second point.

6. The method of claim 1, wherein causing the scanner to capture the point clouds comprises:

instructing an autonomous vehicle with the scanner to travel to locations of the area, identified in the final point cloud capture plan, and capture the point clouds of the final point cloud capture plan.

7. The method of claim 1, wherein performing the one or more actions further comprises:

generating navigation instructions based on the three-dimensional digital layout; and providing the navigation instructions to a user device.

8. A device, comprising:

one or more memories; and one or more processors, communicatively coupled to the one or more memories, configured to:

receive a two-dimensional layout of an area to be captured by a scanner, wherein the two-dimensional layout of the area comprises a plurality of zones;

receive scanner parameters associated with the scanner;

calculate a width of a field of view for the scanner based on a horizontal field of view parameter and a distance parameter provided in the scanner parameters;

calculate a height of the field of view based on a vertical field of view parameter and the distance parameter provided in the scanner parameters;

calculate a reduced field of view for the scanner based on the width of the field of view, the height of the field of view, and a reduction coefficient, wherein the reduced field of view is a portion of a field of view of the scanner;

overlay, using the reduced field of view, a geometrical object, representing the reduced field of view, on the area until the area is filled with a plurality of geometrical objects;

calculate, based on locations of the plurality of geometrical objects on the area, a point cloud capture plan for the scanner to capture a first point cloud and a second point cloud, wherein the point cloud capture plan identifies a first location and a second location, associated with a first point and a second point of a first geometrical object and a second geometrical object of the plurality of geometrical objects, respectively, in the area to position the scanner to capture at least a portion of the area in the first point cloud and the second point cloud, respectively;

identify, based on calculating the point cloud capture plan, a zone, of the plurality of zones of the two-dimensional layout, that is at least partially obstructed by an obstruction;

determine, based on identifying the zone, a third point, of a third geometrical object that is different from the plurality of geometrical objects and to be overlaid on the area, for capturing a third point cloud and generating a modified point cloud capture plan, wherein the modified point cloud capture plan identifies the first location, the second location, and a third location, and wherein the third location is associated with the third point;

modify or eliminate, based on generating the modified point cloud capture plan, at least one of the first point or the second point to reduce a size of an overlapping portion between the third point cloud and at least one of the first point cloud or the second point cloud to generate a final point cloud capture plan; and perform, based on generating the final point cloud capture plan, one or more actions, wherein the one or more actions include:

causing the scanner to capture point clouds of the final point cloud capture plan to generate a three-dimensional digital layout based on the point clouds of the final point cloud capture plan.

9. The device of claim 8, wherein the one or more processors, when causing the scanner to capture the point clouds of the final point cloud capture plan, are configured to:

instruct an autonomous vehicle with the scanner to travel to locations of the area, identified in the final point cloud capture plan, and capture the point clouds of the final point cloud capture plan.

10. The device of claim 8, wherein the one or more processors, when performing the one or more actions, are further configured to:

generate navigation instructions based on the three-dimensional digital layout; and provide the navigation instructions to a user device.

11. The device of claim 8, wherein the scanner includes a three-hundred and sixty degree scanner.

12. The device of claim 8, wherein the one or more processors, when performing the one or more actions, are further configured to:

receive, based on causing the scanner to capture the point clouds, the point clouds from the scanner.

13. The device of claim 8, wherein the scanner parameters include one or more of:

a field of view of the scanner, a range of the scanner, or a resolution of the scanner.

14. The device of claim 8, wherein overlaying the plurality of geometrical objects using of the reduced field of view provides a reduced overlapping portion between the first point cloud and the second point cloud.

15. The device of claim 8, wherein the one or more processors are further configured to:

identify the at least one of the first point or the second point of the modified point cloud capture plan as causing the overlapping portion to modify or eliminate the at least one of the first point or the second point.

16. A non-transitory computer-readable medium storing a set of instructions, the set of instructions comprising:
one or more instructions that, when executed by one or more processors of a device, cause the device to:
receive a two-dimensional layout of an area to be captured by a scanner,
wherein the two-dimensional layout of the area comprises a plurality of zones;
receive scanner parameters associated with the scanner;
calculate a reduced field of view for the scanner based on the scanner parameters,
wherein the reduced field of view is a portion of a field of view of the scanner;
overlay, using the reduced field of view, a geometrical object, representing the reduced field of view, on the area until the area is filled with a plurality of geometrical objects;
calculate, based on locations of the plurality of geometrical objects on the area, a point cloud capture plan for the scanner to capture a first point cloud and a second point cloud,
wherein the point cloud capture plan identifies a first location and a second location, associated with a first point and a second point of a first geometrical object and a second geometrical object of the plurality of geometrical objects, respectively, in the area to position the scanner to capture at least a portion of the area in the first point cloud and the second point cloud, respectively;
identify, based on calculating the point cloud capture plan, a zone, of the plurality of zones of the two-dimensional layout, that is at least partially obstructed by an obstruction;
determine, based on identifying the zone, a third point, of a third geometrical object that is different from the plurality of geometrical objects and to be overlaid on the area, for capturing a third point cloud and generating a modified point cloud capture plan,
wherein the modified point cloud capture plan identifies the first location, the second location, and a third location, and
wherein the third location is associated with the third point;
modify or eliminate, based on generating the modified point cloud capture plan, at least one of the first point or the second point to reduce a size of an overlapping portion between the third point cloud and at least one of the first point cloud or the second point cloud to generate a final point cloud capture plan; and
cause the scanner to capture point clouds of the final point cloud capture plan to generate a three-dimensional digital layout based on the point clouds of the final point cloud capture plan.

17. The non-transitory computer-readable medium of claim 16, wherein the scanner parameters include a horizontal field of view, a vertical field of view, and a distance parameter for capturing a point cloud for an area,
wherein the one or more instructions, that cause the device to calculate the reduced field of view for the scanner, cause the device to:
calculate a width of a field of view for the scanner based on the horizontal field of view parameter and the distance parameter;
calculate a height of the field of view based on the vertical field of view parameter and the distance parameter; and
calculate the reduced field of view based on the width of a field of view, the height of a field of view, and a reduction coefficient.

18. The non-transitory computer-readable medium of claim 16, wherein the one or more instructions further cause the device to:
identify the at least one of the first point or the second point of the modified point cloud capture plan as causing the overlapping portion to modify or eliminate the at least one of the first point or the second point.

19. The non-transitory computer-readable medium of claim 16, wherein the one or more instructions further cause the device to:
instruct an autonomous vehicle with the scanner to travel to locations of the area, identified in the final point cloud capture plan, and capture point clouds; or
provide a message instructing a technician with the scanner to travel to the locations of the area, identified in the final point cloud capture plan, and capture point clouds.

20. The non-transitory computer-readable medium of claim 16, wherein overlaying the plurality of geometrical objects using of the reduced field of view provides a reduced overlapping portion between the first point cloud and the second point cloud.

* * * * *

UNITED STATES PATENT AND TRADEMARK OFFICE
CERTIFICATE OF CORRECTION

| | | |
|---|---|---|
| PATENT NO. | : 11,216,005 B1 | Page 1 of 1 |
| APPLICATION NO. | : 16/948931 | |
| DATED | : January 4, 2022 | |
| INVENTOR(S) | : Adrien Guillonnet | |

It is certified that error appears in the above-identified patent and that said Letters Patent is hereby corrected as shown below:

In the Claims

In Claim 1, Column 14, Line 49, "the first point cloud and or the" should be changed to -- the first point cloud or the --.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*